(12) United States Patent
Zheng

(10) Patent No.: US 9,955,184 B2
(45) Date of Patent: Apr. 24, 2018

(54) VIDEO CODING AND DECODING METHODS AND APPARATUSES

(71) Applicant: HUAWEI TECHNOLOGIES CO., LTD., Shenzhen, Guangdong (CN)

(72) Inventor: Xiaozhen Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 15/217,334

(22) Filed: Jul. 22, 2016

(65) Prior Publication Data

US 2016/0330476 A1 Nov. 10, 2016

Related U.S. Application Data

(63) Continuation of application No. 13/647,682, filed on Oct. 9, 2012, now Pat. No. 9,426,487, which is a (Continued)

(30) Foreign Application Priority Data

Apr. 9, 2010 (CN) .......................... 2010 1 0149309

(51) Int. Cl.
*H04N 19/583* (2014.01)
*H04N 19/119* (2014.01)
(Continued)

(52) U.S. Cl.
CPC ......... *H04N 19/583* (2014.11); *H04N 19/119* (2014.11); *H04N 19/176* (2014.11);
(Continued)

(58) Field of Classification Search
CPC .. H04N 19/176; H04N 19/119; H04N 19/196; H04N 19/463; H04N 19/583; H04N 19/91
See application file for complete search history.

(56) References Cited

U.S. PATENT DOCUMENTS

2004/0028282 A1 2/2004 Kato et al.
2006/0268982 A1 11/2006 Lee
(Continued)

FOREIGN PATENT DOCUMENTS

CN 1195255 10/1998
CN 1939064 3/2007
(Continued)

OTHER PUBLICATIONS

Search Report, dated Jun. 4, 2015, in corresponding Chinese Application No. 2011800158645 (2 pp.).
(Continued)

*Primary Examiner* — Neil Mikeska
(74) *Attorney, Agent, or Firm* — Staas & Halsey LLP

(57) ABSTRACT

A coding method includes: partitioning an image block to be decoded irregularly according to an irregular partitioning mode and a position parameter to obtain at least two different sub-blocks; comparing the sub-blocks with a reference sub-block to obtain a residual of a pixel value of the image block to be coded; obtaining a reference position parameter according to a surrounding block of the image block to be coded, and subtracting the reference position parameter from the position parameter of the image block to be coded to obtain a position parameter difference of the image block to be coded; quantizing the residual, and performing entropy coding on a result of the quantization, the motion vector information, and the position parameter difference; and writing the entropy coding result and partitioning mode information of the image block into a code stream.

18 Claims, 5 Drawing Sheets

Related U.S. Application Data continuation of application No. PCT/CN2011/072562, filed on Apr. 9, 2011.

(51) Int. Cl.

| | | |
|---|---|---|
| *H04N 19/176* | (2014.01) | |
| *H04N 19/91* | (2014.01) | |
| *H04N 19/196* | (2014.01) | |
| *H04N 19/463* | (2014.01) | |
| *H04N 19/593* | (2014.01) | |

(52) U.S. Cl.
CPC ......... *H04N 19/196* (2014.11); *H04N 19/463* (2014.11); *H04N 19/91* (2014.11); *H04N 19/593* (2014.11)

(56) References Cited

U.S. PATENT DOCUMENTS

| | | | |
|---|---|---|---|
| 2007/0053441 | A1 | 3/2007 | Wang et al. |
| 2007/0065030 | A1 | 3/2007 | Shen |
| 2007/0183673 | A1 | 8/2007 | Mietens |
| 2007/0230574 | A1* | 10/2007 | Valente ............... H04N 19/172 375/240.13 |
| 2008/0055331 | A1 | 3/2008 | Iourcha |
| 2008/0101707 | A1 | 5/2008 | Mukherjee |
| 2008/0159387 | A1 | 7/2008 | Dvir |
| 2008/0240246 | A1 | 10/2008 | Lee |
| 2009/0003441 | A1* | 1/2009 | Sekiguchi ........... H04N 19/176 375/240.13 |
| 2009/0196342 | A1 | 8/2009 | Divorra Escoda et al. |
| 2009/0196517 | A1 | 8/2009 | Divorra Escoda et al. |
| 2009/0238283 | A1 | 9/2009 | Han |
| 2009/0268810 | A1 | 10/2009 | Dai |
| 2010/0086052 | A1* | 4/2010 | Park ..................... H04N 19/176 375/240.16 |
| 2010/0118959 | A1 | 5/2010 | Lou |
| 2010/0189181 | A1 | 7/2010 | Zheng et al. |
| 2010/0195715 | A1 | 8/2010 | Liu et al. |
| 2010/0208818 | A1 | 8/2010 | Yin |
| 2011/0200109 | A1 | 8/2011 | Joshi |
| 2011/0249751 | A1 | 10/2011 | Laroche |
| 2012/0106647 | A1 | 5/2012 | Jung |
| 2012/0177106 | A1 | 7/2012 | Divorra Escoda |

FOREIGN PATENT DOCUMENTS

| | | |
|---|---|---|
| CN | 101072356 | 11/2007 |
| CN | 101213842 | 7/2008 |
| CN | 101389021 | 3/2009 |
| CN | 101415121 | 4/2009 |
| CN | 101500160 | 8/2009 |
| CN | 101502119 | 8/2009 |
| CN | 101502120 | 8/2009 |
| CN | 101523917 | 9/2009 |
| CN | 101605261 | 12/2009 |
| CN | 101873500 | 10/2010 |
| GB | 2323993 | 10/1998 |
| WO | WO2008/016605 | 2/2008 |
| WO | WO2009/051668 | 4/2008 |
| WO | WO2008/127568 | 10/2008 |
| WO | WO2009/051719 | 4/2009 |
| WO | WO2009/099510 | 8/2009 |

OTHER PUBLICATIONS

Office Action, dated Jun. 12, 2015, in corresponding Chinese Application No. 2011800158645 (6 pp.).

*Series H: Audiovisual and Multimedia Systems Infrastructure of audiovisual services—Coding of moving video, Advanced coding for generic audiovisual services*, ITU-T H.264 (Mar. 2010), pp. 1-651.

*TE3: Huawei & Hisilicon report on flexible motion partitioning coding*, Joint Collaborative Team on Video Coding (JCT-VC) of ITU-T SG16 WP3 and ISO/IEC JTC1/SC29/WG11, JCTVC-B041, Jul. 21-28, 2010 (38 pp.).

Notice of Allowance, dated Apr. 27, 2016, in related U.S. Appl. No. 13/647,682.

Chinese Office Action and Search Report, dated Dec. 24, 2015, in corresponding Chinese Patent Application No. 201180015864.5.

Office Action, dated Dec. 3, 2015, in related U.S. Appl. No. 13/647,682.

Restriction Requirement, dated Jun. 8, 2015, in related U.S. Appl. No. 13/647,682.

Chinese Office Action dated Dec. 26, 2013 in corresponding Chinese Patent Application No. 201010237816.8.

Chinese Office Action dated Jul. 2, 2013 in corresponding Chinese Application No. 201010237816.8.

Vermeirsh, K. et al., *Evaluation of Transform Performance When Using Shape-Adaptive Partitioning in Video Coding*, Ghent University-IBBT (4 pp.).

*Complexity Analysis of Improved MB Prediction Modes*, Joint Video Team (IVT) of ISO/IEC MPEG & ITU-T VCEG, JVT-C119, May 6-10, 2002, pp. 1-8.

Dai, C. et al., *Geometry-Adaptive Block Partitioning for Intra Prediction in Image & Video Coding*, 2007 IEEE, pp. 85-88.

*Geometry-adaptive Block Partitioning on B-Frames*, ITU—Telecommunications Standardization Sector, VCEG-AG13, Oct. 20, 2007 (37 pp.).

*New Macroblock Bipartitioning Modes for Inter Coding*, ITU—Telecommunication Standardization Sector, VCEG-AH25, Jan. 12-13, 2008, pp. 1-8.

*Flexible macroblock partition for inter-frame coding*, Joint Collaborative Team on Video Coding (JCT-VC) of ITU-T SG116 WP3 and ISO/IEC JTC1/SC29/WG11, JCTVC-A029, Apr. 15-23, 2010 (14 pp.).

*Description of video coding technology proposal by Huawei Technologies & Hisilicon Technologies*, Joint Collaborative Team on Video Coding (JCT-VC) of ITU-T SG16 WP3 and ISO/IEC JTC1/SC29/WG11, JCTVC-A111, Apr. 15-23, 2010 (87 pp.).

*TE3: Huawei & Hisilicon report on flexible motion partitioning coding*, Joint Collaborative Team on Video Coding (JCT-VC) of ITU-T SG16 WP3 and ISO/IEC JTC1/SC29/WG11, JCTVC-8041, Jul. 21-28, 2010 (24 pp.).

International Search Report, dated Jul. 14, 2011, in corresponding International Application No. PCT/CN2011/072562 (6 pp.).

Written Opinion of the International Searching Authority, dated Jul. 14, 2011, in corresponding International Application No. PCT/CN2011/072562 (5 pp.).

Search Report, dated Sep. 20, 2010, in corresponding Chinese Application No. 201010237816.8 (2 pp.).

First Office Action, dated Sep. 28, 2012, in corresponding Chinese Application No. 201010237816.8 (5 pp.).

U.S. Appl. No. 13/647,682, filed Oct. 9, 2012, Xiaozhen Zheng, Huawei Technologies Co., Ltd.

* cited by examiner

VIDEO CODING AND DECODING METHODS AND APPARATUSES

CROSS-REFERENCE TO RELATED APPLICATIONS

This application is a continuation of U.S. patent application Ser. No. 13/647,682, filed on Oct. 9, 2012, which is a continuation of International Application No. PCT/CN2011/072562, filed on Apr. 9, 2011, which claims priority to Chinese Patent Application No. 201010149309.9, filed on Apr. 9, 2010. The afore-mentioned patent applications are hereby incorporated by reference in their entireties.

FIELD OF THE INVENTION

The present invention relates to the field of video coding and decoding, and in particular, to video coding and decoding methods and apparatuses for partitioning an irregular sub-block.

BACKGROUND OF THE INVENTION

In the existing video coding and decoding technology, generally, a pixel value of an image block of a current frame picture is subtracted by a pixel value of a reference image block to obtain a residual, and then the obtained residual is written, after being quantized and entropy-coded, into a code stream, and is transmitted together with motion vector information to a decoder. The decoder reads a bit stream in the obtained code stream, and then performs dequantization to obtain a corresponding residual, then obtains the reference image block of the current image block according to the motion vector information in the code stream, and adds the residual to the reference image block to obtain the pixel value of the current image block.

In a coding and decoding process in the prior art, in both the residual calculation and search for a reference image block, an image block is generally partitioned into sub-blocks, and the sub-block is used as a unit for prediction. These sub-blocks are rectangular areas partitioned from the image block according to the distribution of image values. However, due to various shapes of objects, it is very difficult for the portioned rectangular sub-blocks to meet the requirements of changes of pixel values of an image that has rich texture characteristics.

SUMMARY OF THE INVENTION

An embodiment of the present invention provides a coding method, including: irregularly partitioning an image block to be coded according to an irregular partitioning mode and a position parameter of the image block to obtain at least two different sub-blocks; comparing the sub-blocks with a reference sub-block to obtain a residual of a pixel value of the image block to be coded; acquiring a reference position parameter according to a neighboring block of the image block to be coded, and subtracting the reference position parameter from a position parameter of the image block to be coded to obtain a position parameter difference of the image block to be coded; quantizing the residual, and performing entropy coding on the result of the quantization, the motion vector information, and the position parameter difference; and writing the entropy coding result and partitioning mode information of the image block into a code stream.

An embodiment of the present invention further provides a coding apparatus, including: a partitioning module, configured to partition an image block irregularly according to a partitioning mode and a corresponding position parameter; a residual obtaining module, configured to compare the sub-blocks with a reference sub-block to obtain a residual of the image block to be coded; a parameter obtaining module, configured to obtain a reference position parameter, and compare the reference position parameter with a position parameter of the image block to be coded to obtain a position parameter difference; a quantization module, configured to quantize the residual; an entropy coding module, configured to perform entropy coding on the result of the quantization of the quantization module, a motion vector, and the position parameter difference; and a sending module, configured to write the entropy coding result of the entropy coding module and the partitioning mode of the image block into a code stream.

An embodiment of the present invention further provides a decoding method, including: obtaining a residual of an image block to be decoded from a code stream; obtaining partitioning mode information of the image block to be decoded from the code stream, and determining an irregular partitioning mode of the image block to be decoded; obtaining motion vector information of the image block to be decoded from the code stream, and determining a position of a reference sub-block of sub-blocks of the image block to be decoded; obtaining a reference position parameter according to a position parameter of a neighboring block, obtaining a position parameter difference from the code stream, and obtaining a position parameter of the image block to be decoded according to the reference position parameter and the position parameter difference; obtaining a reference pixel value from the reference sub-block according to the position parameter of the image block to be decoded and the partitioning mode of the image block to be decoded; and obtaining a pixel value of the sub-block of the image block to be decoded according to the reference pixel value and the residual.

An embodiment of the present invention further provides a decoding apparatus, including: a residual obtaining module, configured to obtain a residual of an image block to be decoded from a code stream; a partitioning information obtaining module, configured to obtain partitioning mode information of the image block to be decoded from the code stream, and determine an irregular partitioning mode of the image block to be decoded; a motion vector obtaining module, configured to obtain motion vector information of the image block to be decoded from the code stream, and determine position information of a reference sub-block of sub-blocks of the image block to be decoded; a position parameter obtaining module, configured to obtain a reference position parameter according to a position parameter of a neighboring block of the image block to be decoded, obtain a position parameter difference from the code stream, and obtain a position parameter of the image block to be decoded according to the reference position parameter and the position parameter difference; a reference pixel value obtaining module, configured to obtain a reference pixel value from the reference sub-block according to the position parameter of the image block to be decoded and the partitioning mode of the image block to be decoded; and an image block obtaining module, configured to obtain a pixel value of the sub-block of the image block to be decoded according to the reference pixel value and the residual.

Through the video coding and decoding methods and apparatuses according to the embodiments of the present invention, an appropriate partitioning mode may be selected according to a layout of pixel values of the image block. Compared with the common rectangular sub-block partitioning mode, the partitioning mode in the technical solution makes a prediction result of the pixel values in coding and decoding processes more reasonable. Further, a difference between the position parameter and the reference position parameter is sent in the code stream only, ensuring that the code stream is not excessively occupied by the position parameters.

BRIEF DESCRIPTION OF THE DRAWINGS

To make the technical solutions of the present invention clearer, the accompanying drawings used for describing the embodiments of the present invention are briefly introduced below. Evidently, the accompanying drawings in the following description are merely some embodiments of the present invention. Persons of ordinary skill in the art may further derive other drawings according to these accompanying drawings without creative efforts.

DETAILED DESCRIPTION OF THE EMBODIMENTS

The technical solutions in the embodiments of the present invention are clearly and fully described below with reference to the accompanying drawings in the embodiments of the present invention. Evidently, the embodiments to be described are merely part rather than all of the embodiments of the present invention. All other embodiments derived by persons of ordinary skill in the art based on the embodiments of the present invention without creative efforts shall fall within the protection scope of the present invention.

Figure 1:
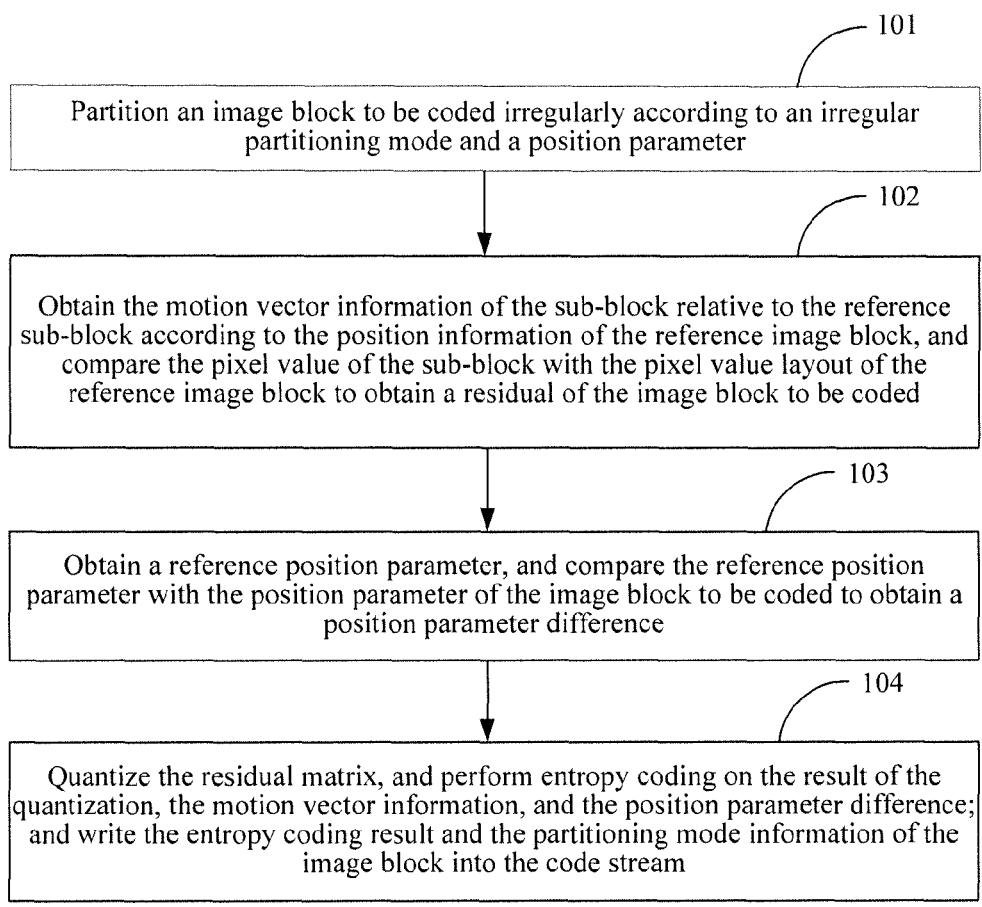
FIG. 1 is a schematic diagram of a video coding method according to an embodiment of the present invention.

Referring to FIG. 1, an embodiment of the present invention provides a video coding method, including:

Step 101: Irregularly partition an image block to be coded according to an irregular partitioning mode and a position parameter, so that the image block to be coded is partitioned into at least two different sub-blocks.

In the embodiment of the present invention, the position parameter indicates a position of an intersection between a border of the image block and a border between the sub-blocks.

In the embodiment of the present invention, the confirmation of the irregular partitioning mode and the position parameter includes:

Step 101a: Partition an image block to be coded irregularly in different ways to obtain multiple different sub-block combinations according to multiple irregular partitioning modes and multiple position parameter values.

Step 101b: Search the image for a reference sub-block according to the multiple different sub-block combinations, and calculate pixel differences between the multiple sub-block combinations and the corresponding reference sub-block.

Step 101c: Select the partitioning mode and the position parameter of the sub-block combination with the minimum pixel difference as the partitioning mode and the position parameter of the image block to be coded, and use the corresponding reference sub-block as a reference sub-block of the image block to be coded.

Figure 2:
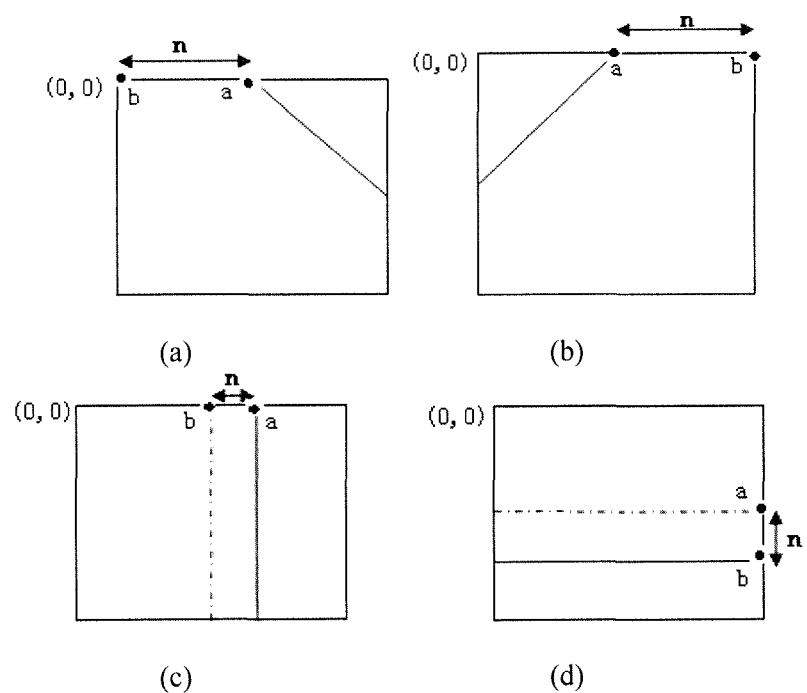
FIG. 2, parts (a)-(d), are partitioning views of an irregular partitioning mode according to an embodiment of the present invention.

In the embodiment of the present invention, partitioning the image block to be coded irregularly includes the four cases of partitioning the image block as shown in FIG. 2a to FIG. 2d, which represent the partitioning mode, namely, mode 0, mode 1, mode 2, and mode 3, respectively. In FIG. 2a, through a 135° borderline, the image block is partitioned into a pentagonal sub-block and a triangular sub-block; in FIG. 2b, through a 45° borderline, the image block is partitioned into a pentagonal sub-block and a triangular sub-block; in FIG. 2c, through a vertical line, the image block is partitioned into two rectangular sub-blocks of different sizes; and in FIG. 2d, through a horizontal line, the image block is partitioned into two rectangular sub-blocks of different sizes.

An image block is formed of pixels. Therefore, the 135° borderline and the 45° borderline that correspond to mode 0 and mode 1 refer to the lines of approximately 135 degrees and 45 degrees formed by pixels along the border between the sub-blocks, respectively.

The position parameter refers to the position of the borderline between the sub-blocks relative to the image block. In the embodiment of the present invention, after the partitioning mode is determined, the distance between an endpoint of the borderline between the surrounding sub-blocks and an endpoint of the image block is used as the position parameter.

For example, it is assumed that the coordinates of an upper left endpoint of the image block in FIGS. 2a to 2d are (0,0), and the size of the image block is m×m. In the foregoing partitioning mode, for mode 0, when the position parameter n is greater than 0, point a is an intersection between an upper border of E and a border between two irregular blocks in FIG. 2a, and its coordinates are (0,m−n); point b is an upper right endpoint of E, and its coordinates are (0,m); when n is smaller than 0, point a is an intersection between a lower border of E and the border between the two irregular blocks in FIG. 2a, and its coordinates are (m,|n|), and b is a lower left endpoint of E, and its coordinates are (m,0). For mode 1, when the position parameter n is greater than 0, point a is an intersection between an upper border of E and a border between two irregular blocks in FIG. 2b, and its coordinates are (0,n); point b is an upper left endpoint of E, and its coordinates are (0,0); when n is smaller than 0, point a is an intersection between a lower border of E and the border between the two irregular blocks in FIG. 2b, and its coordinates are (m,m−|n|), and b is a lower right endpoint of E, and its coordinates are (m,m). For mode 2, n being greater than 0 indicates that the border between two irregular blocks in FIG. 2c is on the right side of the dotted line shown in FIG. 2c. In this case, the coordinates of point a are (0,m/2+n), and the coordinates of point b are (0,m/2); n being smaller than 0 indicates that the border between two irregular blocks in FIG. 2c is on the left side of the dotted line shown in FIG. 2c. In this case, the coordinates of point a are (0,m/2−|n|), and the coordinates of point b are (0,m/2). The dotted line in FIG. 2c is a vertical medial axis of E. For mode 3, n being greater than 0 indicates that the border between two irregular blocks in FIG. 2d is below the dotted line shown in FIG. 2d. In this case, the coordinates of point a are (m/2+n,0), and the coordinates of point b are (m/2,0); n being smaller than 0 indicates that the border between two irregular blocks in FIG. 2d is above the dotted line shown in FIG. 2d. In this case, the coordinates of point a are (m/2−|n|,0), and the coordinates of point b are (m/2,0). The dotted line in FIG. 2d is a horizontal medial axis of E. In a specific application process, the partitioning mode may be preset, and the size of the pixel point is used as a unit for the value of the position parameter. In a word, it is merely required to try multiple values of the position parameter in each partitioning mode, search a corresponding reference sub-block, and select the most appropriate partitioning mode and position parameter according to the final difference between the sub-block and the reference sub-block. Definitely, in other optional embodiments, irregular partitioning may also be performed directly according to a preset irregular partitioning mode and position parameter.

In the foregoing partitioning solution, |n| indicates an absolute value of the parameter n.

It should be understood that, in other optional embodiments, the image block may also be partitioned into multiple sub-blocks through multiple borderlines, as long as a corresponding partitioning mode is preset.

In addition, for mode 0 and mode 1, when the value of the position parameter is 0, the image block is partitioned into two equal triangles.

Definitely, in the embodiment of the present invention, the reference sub-block of each sub-block may be selected among sub-blocks of different image blocks in different images.

In the embodiment of the present invention, the reference image block and the reference sub-block refer to the image block used for reference coding or decoding for the image block or sub-block currently to be coded or decoded in the reference image, respectively.

Step 102: Obtain the motion vector information of the sub-block relative to the reference sub-block according to the position information of the reference image block, and compare the pixel value of the sub-block with the pixel value of the reference image block to obtain a residual of the image block to be coded.

In the present invention, the motion vector information includes a motion vector of the sub-block of the image block to be coded relative to the reference sub-block, or includes a difference between the reference motion vector and the motion vector of the sub-block of the image block to be coded relative to the reference sub-block. In the case of the difference, the decoder further needs to obtain a corresponding motion vector according to the reference motion vector.

In the embodiment of the present invention, the sub-blocks obtained through partitioning are subtracted from a corresponding reference sub-block respectively, so as to obtain a residual value at the corresponding position in the residual. That is to say, the reference sub-block is not necessarily located in the same image block, and the motion vector information of each sub-block relative to the reference sub-block may also be different. Therefore, the motion vector information of multiple sub-blocks needs to be recorded together.

Step 103: Obtain a reference position parameter, and compare the reference position parameter with the position parameter of the image block to be coded to obtain a position parameter difference.

In the embodiment of the present invention, the position parameter of the image block to be coded may be subtracted by the reference position parameter, thereby obtaining a position parameter difference. The reference position parameter may be the position parameter of the reference image block.

In another embodiment of the present invention, the reference position parameter may also be determined according to the surrounding blocks of the image block to be coded. For example, it is assumed that the current image block E has four surrounding blocks A, B, C, and D. A is a left surrounding block of E; B is an upper surrounding block of E; C is an upper right surrounding block of E; and D is an upper left surrounding block of E. The position parameters of irregular partitioning of A, B, and E are denoted as posA, posB, and posE respectively. Because the texture information and image characteristics of a video image are continuous, the position parameters of surrounding image blocks of the current image block may be used to predict the reference position parameter of the current image block, where the reference position parameter is denoted as PposE (Predicted posE). The coder writes the difference DposE between PosE and PposE into the code stream. Specifically, when only one image block in the surrounding blocks of the image block to be coded has the same irregular partitioning mode as that of the image block to be coded, the reference position parameter of the image block to be coded is equal to the position parameter of the image block; when multiple image blocks in the surrounding blocks of the image block to be coded has the same irregular partitioning mode as that of the image block to be coded, the reference position parameter of the image block to be coded is selected according to the multiple image blocks. When no image block in the surrounding blocks of the image block to be coded has the same irregular partitioning mode as that of the image block to be coded, the position parameter of the image block to be coded is 0.

Specifically:

First, set variables ConditionA, ConditionB, ConditionC, ConditionD, ModeA, ModeB, ModeC, ModeD, and ModeE. ModeA, ModeB, ModeC, ModeD, and ModeE represent the partitioning modes of the image blocks A, B, C, D, and E, respectively, and the value range is [0, 3]; ConditionA, ConditionB, ConditionC, and ConditionD are judgment flags.

The value of ConditionA is 0 when image block A meets one of the following conditions:

image block A is not available;

irregular block partitioning is not applied to image block A; or the irregular block partitioning is applied to image block A, but the partitioning mode is different from the partitioning mode of image block E, namely, ModeA≠ModeE.

When the irregular block partitioning is applied to image block A and the partitioning mode is the same as the partitioning mode of image block E (namely, ModeA=ModeE), the value of ConditionA is 1.

The value of ConditionB is 0 when image block B meets one of the following conditions:

image block B is not available;

irregular block partitioning is not applied to image block B; or the irregular block partitioning is applied to image block B, but the partitioning mode is different from the partitioning mode of image block E, namely, ModeB≠ModeE.

When the irregular block partitioning is applied to image block B and the partitioning mode is the same as the partitioning mode of image block E (namely, ModeB=ModeE), the value of ConditionB is 1.

The value of ConditionC is 0 when image block C meets one of the following conditions:
image block C is not available;
irregular block partitioning is not applied to image block C; or
the irregular block partitioning is applied to image block C, but the partitioning mode is different from the partitioning mode of image block E, namely, ModeC≠ModeE.

When the irregular block partitioning is applied to image block C and the partitioning mode is the same as the partitioning mode of image block E (namely, ModeC=ModeE), the value of ConditionC is 1.

The value of ConditionD is 0 when image block D meets one of the following conditions:
image block D is not available;
irregular block partitioning is not applied to image block D; or
the irregular block partitioning is applied to image block D, but the partitioning mode is different from the partitioning mode of image block E, namely, ModeD≠ModeE.

When the irregular block partitioning is applied to image block D and the partitioning mode is the same as the partitioning mode of image block E (namely, ModeD=ModeE), the value of ConditionD is 1.

Next, the method for obtaining the reference position parameter includes:
if the value of ConditionA is 1 and the value of ConditionB is 0, PposE=posA; otherwise
if the value of ConditionA is 0 and the value of ConditionB is 1, PposE=posB; otherwise
if the value of ConditionA is 1 and the value of ConditionB is 1, PposE=Min(posA, posB), and
otherwise, PposeE=0.

The foregoing method for obtaining the PposE is applicable to the irregular block partitioning mode of Mode0, Mode1, Mode2, and Mode3.

Further, if the texture characteristics of the image are further considered, the following method for obtaining the PposeE may also be used:

If an irregular block partitioning mode of Mode2 or Mode3 is applied to the current image block, it means that, in this case, the foregoing method for obtaining PposeE is applied to the current image block to obtain PposE when the texture information of the surrounding block of the current sub-block tends to be horizontal texture and vertical texture.

If an irregular block partitioning mode of Mode0 or Mode1 is applied to the current image block, it means that, in this case, the following method is applied to the current image block to obtain PposE when the texture information of the surrounding block of the current sub-block tends to be non-horizontal texture and non-vertical texture:

In a case that the irregular partitioning mode of Mode0 is applied to the current image block,
if the value of ConditionA is 1 and the value of ConditionB is 0 and the value of ConditionD is 0, PposE=posA; otherwise
if the value of ConditionA is 0 and the value of ConditionB is 1 and the value of ConditionD is 0, PposE=posB; otherwise
if the value of ConditionA is 0 and the value of ConditionB is 0 and the value of ConditionD is 1, PposE=posD; otherwise
if the value of ConditionA is 1 and the value of ConditionB is 1 and the value of ConditionD is 0, PposE=Min(posA, posB); otherwise
if the value of ConditionA is 0 and the value of ConditionB is 1 and the value of ConditionD is 1, PposE=Min(posB, posD); otherwise
if the value of ConditionA is 1 and the value of ConditionB is 0 and the value of ConditionD is 1, PposE=Min(posA, posD); otherwise
if the value of ConditionA is 1 and the value of ConditionB is 1 and the value of ConditionD is 1, PposE=Min(posA, posB, posD); otherwise
if the value of ConditionA is 0 and the value of ConditionB is 0 and the value of ConditionD is 0, PposE=0.

In a case that the irregular partitioning mode of Mode1 is applied to the current image block,
if the value of ConditionA is 1 and the value of ConditionB is 0 and the value of ConditionC is 0, PposE=posA; otherwise
if the value of ConditionA is 0 and the value of ConditionB is 1 and the value of ConditionC is 0, PposE=posB; otherwise
if the value of ConditionA is 0 and the value of ConditionB is 0 and the value of ConditionC is 1, PposE=posC; otherwise
if the value of ConditionA is 1 and the value of ConditionB is 1 and the value of ConditionC is 0, PposE=Min(posA, posB); otherwise
if the value of ConditionA is 0 and the value of ConditionB is 1 and the value of ConditionC is 1, PposE=Min(posB, posC); otherwise
if the value of ConditionA is 1 and the value of ConditionB is 0 and the value of ConditionC is 1, PposE=Min(posA, posC); otherwise
if the value of ConditionA is 1 and the value of ConditionB is 1 and the value of ConditionC is 1, PposE=Min(posA, posB, posC); otherwise
if the value of ConditionA is 0 and the value of ConditionB is 0 and the value of ConditionD is 0, PposE=0.

In the foregoing steps, the Min function is used to acquire the parameter with the minimum value. Definitely, other mathematical functions and equations may be used to acquire PposE, for example, the function of acquiring the maximum value is used or the average value is calculated to acquire PposE, or PposE is acquired through weighting, or searching a preset mapping table for PposE according to the value of the position parameter of the surrounding block.

Further, in view of the texture direction of the image block, if a horizontal irregular block partitioning mode or a vertical irregular block partitioning mode is applied to the current image block, the image block adjacent to the current image block in the horizontal or vertical directions is significantly correlated with the image content of the current image block, and therefore, the reference position parameter of the current image block is obtained according to the foregoing steps. If an irregular block partitioning mode of Mode0 or Mode1 is applied to the current image block, the image block adjacent to the current image block in the 135° direction (Mode0) or 45° direction (Mode1) is significantly correlated with the image content of the current image block, and therefore, the reference position parameter of the current image block is obtained according to the following step:

obtain PposE, and then calculate the value of DposE, and the calculation method is DposE=posE−PposE.

In another embodiment of the present invention, the method for calculating DposE may further be: searching a preset mapping table for DposE according to the values of posE and PposE.

Step 104: Quantize the residual, and perform entropy coding on the result of the quantization, the motion vector information, and the position parameter difference; and write the entropy coding result and the partitioning mode information of the image block into the code stream.

In view of that the position parameter has the symbol issue, a symbol bit may be added in the code stream additionally to record the symbol of the position parameter.

Through the video coding method according to the embodiment of the present invention, an appropriate partitioning mode may be selected according to the layout of the pixel values of the image block. Compared with the common rectangular sub-block partitioning mode, the partitioning mode in the technical solution enables a prediction result of the pixel values in a coding and decoding process to be more reasonable.

Further, in this embodiment of the present invention, a difference between the position parameter and the reference position parameter is sent in the code stream only, which ensures that the code stream is not excessively occupied by the position parameters.

Figure 3:
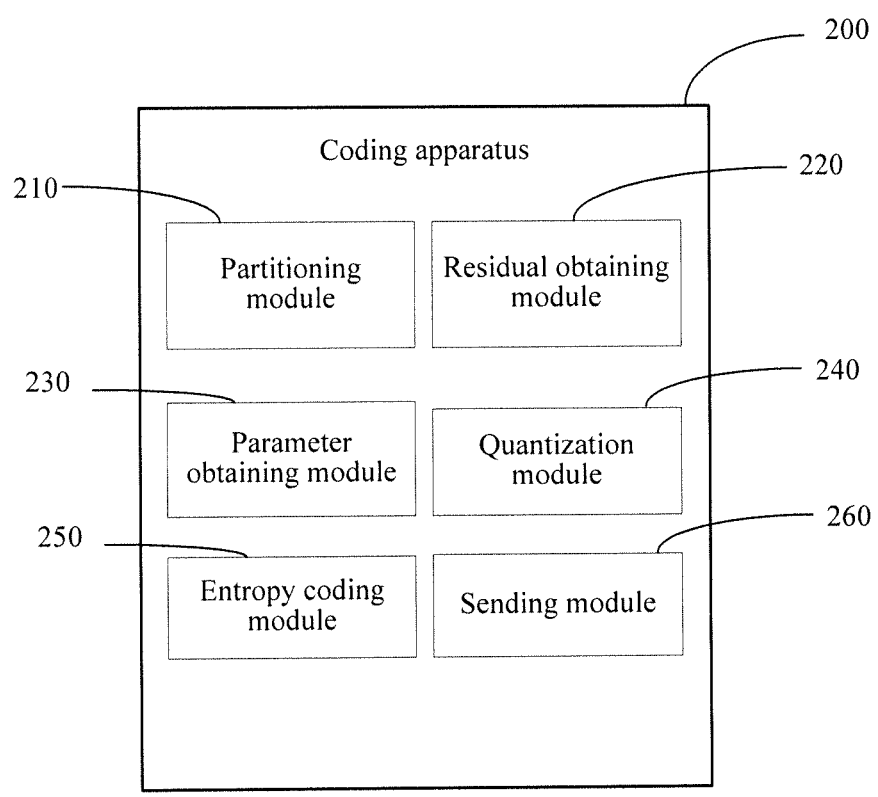
FIG. 3 is a schematic diagram of a coding apparatus according to an embodiment of the present invention.

Referring to FIG. 3, an embodiment of the present invention further provides a coding apparatus 200, which is configured to implement the coding method provided in the embodiment of the present invention. The coding apparatus includes the following modules.

A partitioning module 210 is configured to partition an image block irregularly, so that an image block to be coded is partitioned into at least two different sub-blocks.

The partitioning module 210 selects a partitioning mode and a corresponding position parameter, so as to partition the image block irregularly to obtain at least two different sub-blocks.

It is easy to be understood that, corresponding to the foregoing coding method, the partitioning module 210 is further configured to select an appropriate partitioning mode and position parameter, so that the pixel value of the sub-block of the image block to be coded is closest to the pixel value of the reference sub-block.

A residual obtaining module 220 is configured to compare the sub-blocks with a reference sub-block to obtain a residual of the image block to be coded.

A parameter obtaining module 230 is configured to obtain a reference position parameter, and compare the reference position parameter with the position parameter of the image block to be coded to obtain a position parameter difference.

A quantization module 240 is configured to quantize the residual.

An entropy coding module 250 is configured to perform entropy coding on the result of the quantization of the quantization module 240, motion vector information, and the position parameter difference.

A sending module 260 is configured to write an entropy coding result of the entropy coding module 250 and the partitioning mode of the image block into a code stream.

Figure 4:
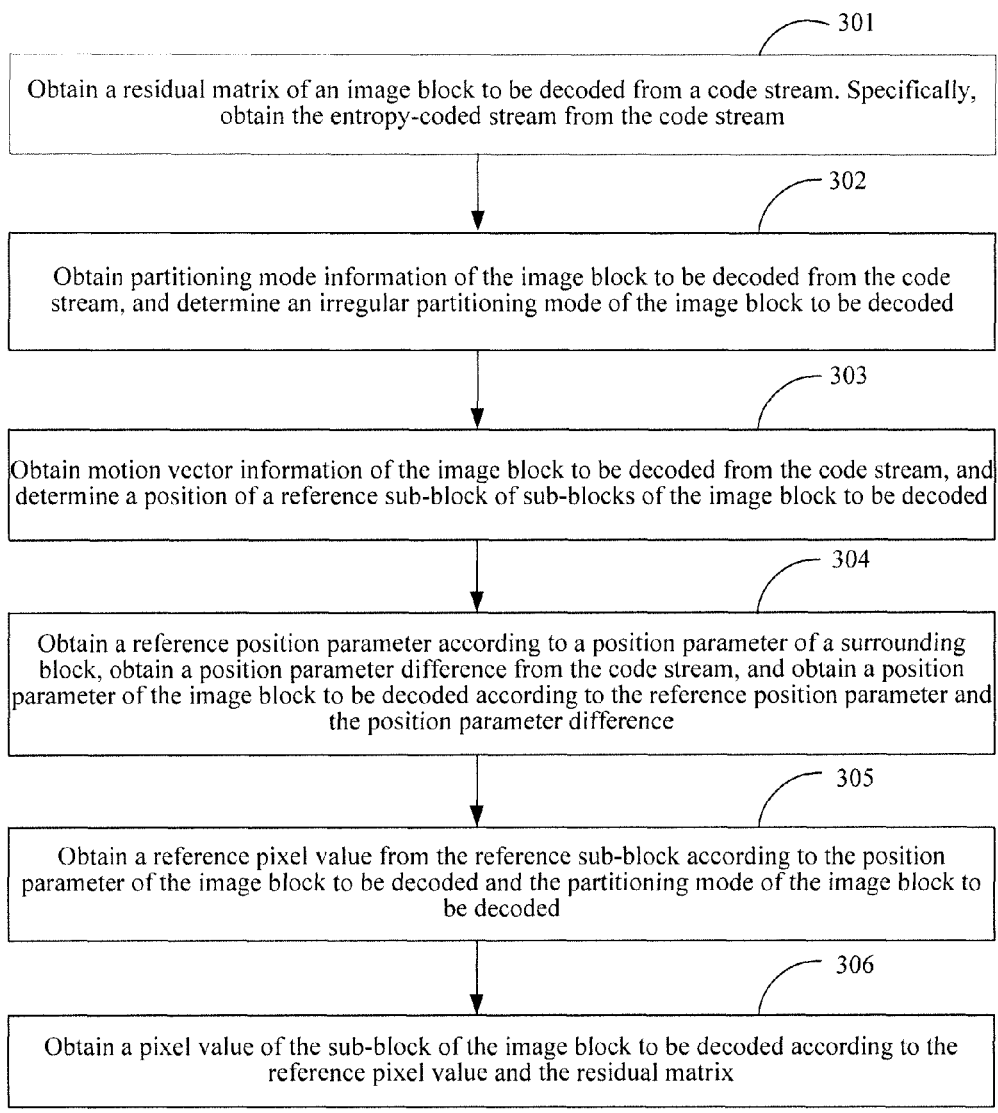
FIG. 4 is a schematic diagram of a decoding method according to an embodiment of the present invention.

Referring to FIG. 4, an embodiment of the present invention further provides a decoding method, which includes the following steps.

Step 301: Obtain a residual of an image block to be decoded from a code stream.

Specifically, obtain the code stream, and perform entropy coding, dequantization, and inverse transformation accordingly, so as to obtain the residual.

Step 302: Obtain partitioning mode information of the image block to be decoded from the code stream, and determine an irregular partitioning mode of the image block to be decoded.

Step 303: Obtain motion vector information of the image block to be decoded from the code stream, and determine a position of a reference sub-block of sub-blocks of the image block to be decoded.

Step 304: Obtain a reference position parameter according to a position parameter of a surrounding block, obtain a position parameter difference from the code stream, and obtain a position parameter of the image block to be decoded according to the reference position parameter and the position parameter difference, where the position parameter difference of the image block to be decoded is equal to the sum of the reference position parameter and the position parameter difference.

The method for obtaining the reference position parameter according to the position parameter of the surrounding block may be the same as or similar to that used in the coder, and is not detailed here again.

Step 305: Obtain a reference pixel value from the reference sub-block according to the position parameter of the image block to be decoded and the partitioning mode of the image block to be decoded.

Step 306: Obtain a pixel value of the sub-block of the image block to be decoded according to the reference pixel value and the residual.

In the decoding process provided in the embodiment of the present invention, the position parameter difference and the partitioning mode information are obtained from the code stream, so that the irregular partitioning mode of the image block to be decoded is determined; and the reference pixel value is obtained from the reference image accordingly, so as to decode the image block.

Figure 5:
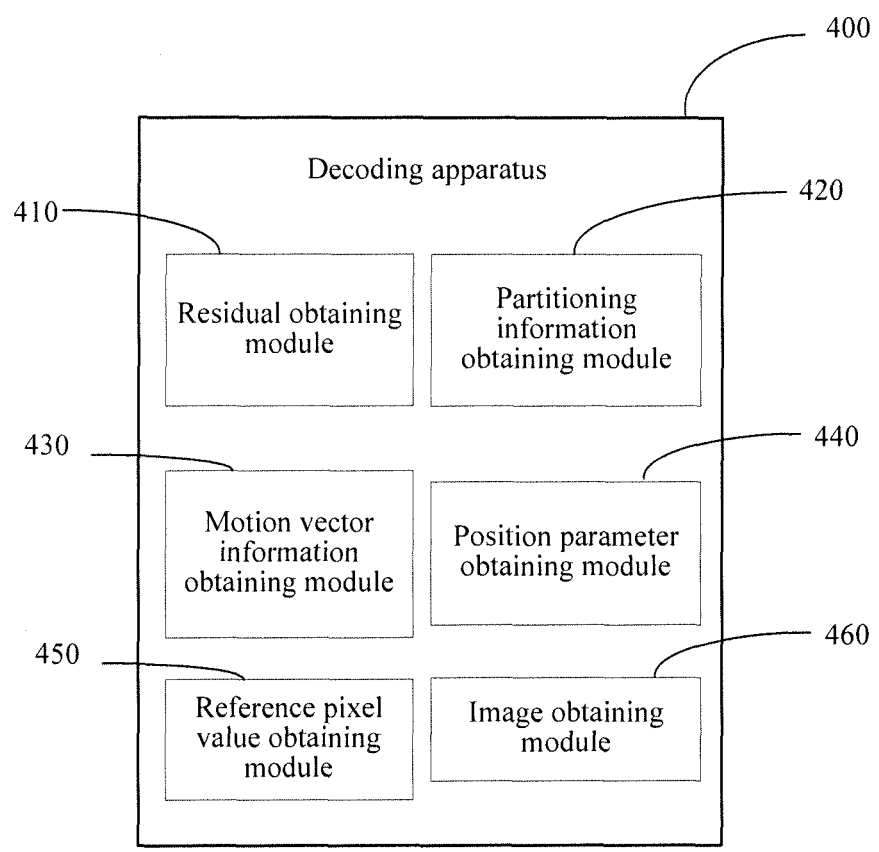
FIG. 5 is a schematic diagram of a decoding apparatus according to an embodiment of the present invention.

An embodiment of the present invention further provides a corresponding decoding apparatus 400. Referring to FIG. 5, the decoding apparatus includes:

a residual obtaining module 410, configured to perform entropy coding and dequantization on a code stream to obtain a residual of an image block to be decoded;

a partitioning information obtaining module 420, configured to obtain partitioning mode information of the image block to be decoded from the code stream, and determine an irregular partitioning mode of the image block to be decoded;

a motion vector information obtaining module 430, configured to obtain motion vector information of the image block to be decoded from the code stream, and determine position information of a reference sub-block of sub-blocks of the image block to be decoded;

a position parameter obtaining module 440, configured to obtain a reference position parameter according to a position parameter of a surrounding block of the image block to be decoded, obtain a position parameter difference from the code stream, and then obtain a position parameter of the image block to be decoded according to the reference position parameter and the position parameter difference;

a reference pixel value obtaining module 450, configured to obtain a reference pixel value from the reference sub-block according to the position parameter of the image block to be decoded and the partitioning mode of the image block to be decoded; and an image obtaining module 460, configured to obtain a pixel value of the sub-block of the image block to be decoded according to the reference pixel value and the residual.

In addition:

In the prior art, an image block to which the irregular partitioning is not applied is generally partitioned into a tree structure. For example, a 16×16 image block may be partitioned into one 16×16 sub-block, two 16×8 sub-blocks, two 8×16 sub-blocks, or four 8×8 sub-blocks. In this way, an image block type flag in the image block may identify the partitioning mode of the sub-block effectively. For example, in H.264/AVC, the macro block type (mbtype) is an image block type flag; mbtype=1 indicates that 16×16 partitioning is applied; mbtype=2 indicates that 8×16 partitioning is applied; mbtype=2 indicates that 16×8 partitioning is applied; and mbtype=3 indicates that 8×8 partitioning is applied.

The flag of the irregular block partitioning mode may also identify the irregular partitioning mode in a way compatible with the tree structure. In the foregoing tree structure partitioning, a flag bit may be added to identify the irregular block partitioning method applied to the current image block. This flag bit is named as isbp_flag (irregular-structure block partition flag). In the code stream, isbp_is located after mbtype. If the value of isbp_flag is 0, it indicates that the irregular partitioning mode is not applied to the current image block. In this case, the partitioning mode of the image block is as follows:

| mbtype | partitioning mode |
|---|---|
| 1 | 16 × 16 |
| 2 | 8 × 16 |
| 3 | 16 × 8 |
| 4 | 8 × 8 |

If the value of isbp_flag is 1, it indicates that the irregular partitioning mode is applied to the current image block. In this case, the partitioning mode of the image block is as follows:

| mbtype | partitioning mode |
|---|---|
| 1 | Mode0 or Mode1 irregular partitioning |
| 2 | Mode2 irregular partitioning |
| 3 | Mode3 irregular partitioning |
| 4 | partitioned into 4 triangles along two diagonals of the 16 × 16 image block |

If mbtype=1 and the value of isbp_flag is 1, another flag bit needs to be added to identify the irregular partitioning mode of the current image block, and this flag bit is named as isbp_direction. If the value of isbp_direction is 0, it indicates that a 135° angle partitioning mode, namely, the partitioning mode Mode0, is applied to the current image block. If the value of isbp_direction is 1, it indicates that a 45° angle partitioning mode, namely, the partitioning mode Mode1, is applied to the current image block.

The process on the decoder is reverse to the process on the coder. After mbtype and isbp_flag are obtained, the partitioning mode of the current image block can be obtained according to the foregoing table.

The benefit of the foregoing coding scheme lies in that, only 1 or 2 bits need to be used to indicate whether the irregular partitioning mode is applied to the current image block, and identify the partitioning mode of the current image block.

Further, in a B frame, mbtype is used to identify the partitioning mode of the current image block, and further identify the reference direction of the current image block or the sub-block. The foregoing identification method may also indicate whether the irregular partitioning mode is applied to the current image block, identify the partitioning mode of the current image block, and identify the reference direction of the current image block or the sub-block. The reference direction of the current image block or the sub-block includes a forward direction, a backward direction, and a bidirectional direction. The forward direction refers to that the image of the reference image block or reference sub-block of the current image block or sub-block is located before the image of the current image block or sub-block. The backward direction refers to that the image of the reference image block or reference sub-block of the current image block or sub-block is located after the image of the current image block or sub-block. The bidirectional direction refers to that, the image of the reference image block or reference sub-block of the current image block or sub-block is located before the image of the current image block or sub-block, and meanwhile, the image of the reference image block or reference sub-block of the current image block or sub-block is partially located after the image of the current image block or sub-block.

The principle and implementation of the present invention are described here through specific examples. The description about the embodiments is merely provided for ease of understanding of the method and core ideas of the present invention. Meanwhile, those of ordinary skill in the art may make variations and modifications to the specific implementations and application scopes according to the ideas of the present invention. Therefore, the specification shall not be construed as a limit to the present invention.

What is claimed is:

1. A decoding method, comprising:
   obtaining a residual of an image block to be decoded from a code stream;
   obtaining partitioning mode information of the image block to be decoded from the code stream, and determining an irregular partitioning mode of the image block to be decoded;
   obtaining motion vector information of the image block to be decoded from the code stream, and determining a position of a reference sub-block of sub-blocks of the image block to be decoded;
   obtaining a reference position parameter according to a position parameter of a surrounding block, obtaining a position parameter difference from the code stream, and obtaining a position parameter of the image block to be decoded according to the reference position parameter and the position parameter difference;
   obtaining a reference pixel value from the reference sub-block according to the position parameter of the image block to be decoded and the partitioning mode of the image block to be decoded; and
   obtaining a pixel value of the sub-block of the image block to be decoded according to the reference pixel value and the residual.

2. The decoding method according to claim 1, wherein the obtaining a position parameter of the image block to be decoded according to the reference position parameter and the position parameter difference comprises: adding the reference position parameter to the position parameter difference, so as to obtain the position parameter of the image block to be decoded.

3. The decoding method according to claim 1, wherein the obtaining a residual of an image block to be decoded from a code stream comprises:
   obtaining an entropy-coded stream; and
   performing entropy decoding, dequantization, and reverse transformation on the entropy-coded stream, so as to obtain the residual.

4. The decoding method according to claim 1, wherein the obtaining a reference position parameter according to the surrounding block of the image block to be decoded comprises: if an irregular partitioning mode that is the same as that of the image block to be decoded is applied to only one of the surrounding blocks of the image block to be decoded, making the reference position parameter be equal to a position parameter of the surrounding block; if an irregular block partitioning mode that is the same as that of the image block to be decoded is applied to none of the surrounding blocks of the image block to be decoded, making the reference position parameter of the image block to be decoded 0; if an irregular partitioning mode that is the same as that of the image block to be decoded is applied to more than one of the surrounding blocks of the image block to be decoded, determining the reference position parameter according to the more than one surrounding block.

5. The decoding method according to claim 4, wherein the determining the reference position parameter according to the more than one surrounding block comprises: using a minimum value among position parameters of the more than one surrounding block as the reference position parameter, or, using an average value of position parameters of the more than one surrounding block as the reference position parameter, or, searching a table for the reference position parameter according to position parameters of the more than one surrounding block.

6. The decoding method according to claim 1, wherein the position parameter indicates a position of an intersection of a border of the image block and a border between sub-blocks, or indicates a distance from the intersection of the border of the image block and the border between the sub-blocks to an endpoint of the image block.

7. The decoding method according to claim 1, wherein the irregular partitioning mode comprises: partitioning the image block into one pentagonal sub-block and one triangular sub-block along a direction from a lower left side to an upper right side; or partitioning the image block into one pentagonal sub-block and one triangular sub-block along a direction from an upper left side to a lower right side; or partitioning the image block into two triangular sub-blocks along a direction from a lower left side to an upper right side; or partitioning the image block into two triangular sub-blocks along a direction from an upper left side to a lower right side; or partitioning the image block into two rectangular sub-blocks of different sizes along a horizontal direction; or partitioning the image block into two rectangular sub-blocks of different sizes along a vertical direction.

8. The decoding method according to claim 1, wherein when the image block is partitioned into two rectangular sub-blocks of different sizes along the horizontal direction, or when the image block is partitioned into two rectangular sub-blocks of different sizes along the vertical direction, the surrounding blocks are an upper-side block and a left-side block that are adjacent to the current image block or sub-block; when the image block is partitioned into one pentagonal sub-block and one triangular sub-block along the direction from the lower left side to the upper right side, or when the image block is partitioned into two triangular sub-blocks along the direction from the lower left side to the upper right side, the surrounding blocks are a left-side block, an upper-side block, and an upper right block that are adjacent to the current image block; when the image block is partitioned into one pentagonal sub-block and one triangular sub-block along the direction from the upper left side to the lower right side, or when the image block is partitioned into two triangular sub-blocks along the direction from the upper left side to the lower right side, the surrounding blocks are an upper left block, an upper-side block, and a right-side block that are adjacent to the current image block.

9. The decoding method according to claim 8, wherein the surrounding blocks comprise an upper-side block adjacent to the current image block or sub-block, or a left-side block adjacent to the current image block or sub-block, or, an upper left block adjacent to the current image block or sub-block, or, an upper right block adjacent to the current image block or sub-block.

10. A decoding method, comprising:
obtaining an image block type parameter and an irregular partitioning identifier from a code stream;
obtaining a partitioning mode of an image block to be decoded according to the irregular partitioning identifier and the image block type parameter; and
decoding the image to be decoded according to the partitioning mode.

11. The decoding method according to claim 10, wherein the image block type is a macro block type.

12. The decoding method according to claim 10, wherein the image block type identifies the partitioning mode of the image block to which the irregular partitioning mode is not applied, or identify the partitioning mode of the image block to which the irregular partitioning mode is not applied and reference directions of the image block and the sub-blocks in the image block.

13. The decoding method according to claim 10, wherein the partitioning modes of the image block to which the irregular partitioning mode is not applied comprise: 32×32, 32×16, 16×32, 16×16, 16×8, 8×16, 8×8, 8×4, 4×8, and 4×4; and the reference directions of the image block and the sub-blocks in the image block comprise a forward direction, a backward direction, and a bidirectional direction.

14. The decoding method according to claim 10, wherein if a current image block is partitioned into one pentagonal sub-block and one triangular sub-block along a direction from a lower left side to an upper right side, or the image block is partitioned into one pentagonal sub-block and one triangular sub-block along a direction from an upper left side to a lower right side, or the image block is partitioned into two triangular sub-blocks along a direction from a lower left side to an upper right side, or the image block is partitioned into two triangular sub-blocks along a direction from an upper left side to a lower right side, a 16×16 or 32×32 image block type is applied; if the image block is partitioned into two rectangular sub-blocks of different sizes along a horizontal direction, a 16×8 or 32×16 image block type is applied; or if the image block is partitioned into two rectangular sub-blocks of different sizes along a vertical direction, an 8×16 or 16×32 image block type is applied.

15. The decoding method according to claim 10, wherein if a current image block is partitioned into one pentagonal sub-block and one triangular sub-block along a direction from a lower left side to an upper right side, or the image block is partitioned into one pentagonal sub-block and one triangular sub-block along a direction from an upper left side to a lower right side, or the image block is partitioned into two triangular sub-blocks along a direction from a lower left side to an upper right side, or the image block is partitioned into two triangular sub-blocks along a direction from an upper left side to a lower right side, the irregular partitioning identifier further comprises a flag that is used to identify a current irregular block partitioning mode, and the irregular block partitioning mode comprises: partitioning the current image block into one pentagonal sub-block and one triangular sub-block along a direction from a lower left side to an upper right side, or partitioning the image block into one pentagonal sub-block and one triangular sub-block along a direction from an upper left side to a lower right side, or partitioning the image block into two triangular sub-blocks along a direction from a lower left side to an upper right side, or partitioning the image block into two triangular sub-blocks along a direction from an upper left side to a lower right side.

16. The decoding method according to claim 10, wherein the irregular partitioning identifier is used to indicate whether the irregular partitioning mode is applied to the image block to be decoded.

17. The decoding method according to claim 10, wherein the image block type parameter indicates specifications of the image block to be decoded.

18. A decoding apparatus, comprising:
a memory; and
a processor coupled to the memory;
the processor configured to:
obtain a residual of an image block to be decoded from a code stream;
obtain partitioning mode information of the image block to be decoded from the code stream, and determining an irregular partitioning mode of the image block to be decoded;
obtain motion vector information of the image block to be decoded from the code stream, and determine a position of a reference sub-block of sub-blocks of the image block to be decoded;
obtain a reference position parameter according to a position parameter of a surrounding block, obtaining a position parameter difference from the code stream, and obtaining a position parameter of the image block to be decoded according to the reference position parameter and the position parameter difference;
obtain a reference pixel value from the reference sub-block according to the position parameter of the image block to be decoded and the partitioning mode of the image block to be decoded; and
obtain a pixel value of the sub-block of the image block to be decoded according to the reference pixel value and the residual.

* * * * *